(12) United States Patent
Kim

(10) Patent No.: US 7,270,753 B2
(45) Date of Patent: Sep. 18, 2007

(54) SURFACTANT-LIKE POLYMER GEL AND A METHOD FOR SEPARATING MATERIAL USING SAME

(76) Inventor: Hongdoo Kim, Jugong Apt. 150-402, #955-1, Youngtong-dong, Paldal-gu, Suwon-si, Kyungki-do (KR) 442-470

( * ) Notice: Subject to any disclaimer, the term of this patent is extended or adjusted under 35 U.S.C. 154(b) by 376 days.

(21) Appl. No.: 10/521,986

(22) PCT Filed: Mar. 4, 2003

(86) PCT No.: PCT/KR03/00414

§ 371 (c)(1),
(2), (4) Date: Jan. 19, 2005

(87) PCT Pub. No.: WO2004/013208

PCT Pub. Date: Feb. 12, 2004

(65) Prior Publication Data

US 2006/0049107 A1    Mar. 9, 2006

(30) Foreign Application Priority Data

Aug. 1, 2002    (KR)    ............. 10-2002-0045542

(51) Int. Cl.
*C02F 3/00* (2006.01)
(52) U.S. Cl. ............ 210/660; 210/690; 210/691; 210/692; 210/917
(58) Field of Classification Search ........... 210/660, 210/690–692, 917
See application file for complete search history.

(56) References Cited

FOREIGN PATENT DOCUMENTS

| WO | WO9617591 A1 | * | 6/1996 |
| WO | WO9714404 A1 | * | 4/1997 |

* cited by examiner

*Primary Examiner*—Chester T. Barry
(74) *Attorney, Agent, or Firm*—Anderson Kill & Olick, P.C.

(57) ABSTRACT

The present invention relates to a polymer gel having a surfactant-like micelle structure obtained by polymerization or condensation polymerization of an ionic surfactant and an organic or inorganic compound having polymerizable moiety, which is capable of adsorbing and separating specific compounds in an easy recyclable manner.

27 Claims, 10 Drawing Sheets

SURFACTANT-LIKE POLYMER GEL AND A METHOD FOR SEPARATING MATERIAL USING SAME

FIELD OF THE INVENTION

The present invention relates to a polymer gel having a micelle structure obtained by polymerization of a surfactant and a polymerizable organic compound and a method for separating an ionic or water-soluble material using same.

BACKGROUND OF THE INVENTION

Surfactants are molecularly dispersed in a dilute aqueous solution, but as the concentration of the surfactants in the solution increases, the surface tension of the solution decreases down to a point at which the surfactants in the solution form aggregates having inwardly oriented hydrophobic groups and outwardly oriented hydrophilic groups thereof. Such aggregates are called micelles and the concentration at which micelles are formed is called the critical micelle concentration (CMC). Physical properties of the surfactant solution, e.g., interfacial tension, surface tension, electrical conductivity, detergency and intensity suddenly change around the CMC.

Micelles in an aqueous surfactant solution are of a spherical shape having inwardly oriented hydrophobic hydrocarbon chains and outwardly extended hydrophilic head parts, while micelles in an oil solution have a reversed shape in which the hydrophobic parts are inwardly oriented and hydrophilic chains are outwardly extended.

Meanwhile, in the adsorptive separation of materials active carbon and silica gel are commonly used. The active carbon and silica gel adsorb materials through physical adsorption and they are generally disposed after use due to the difficulty of desorbing the adsorbed materials.

Recently, Steven R. Kline has found based on a small angle neutron scattering (SANS) experiment that the cylinderlic micelle structure of a specific surfactant, cetyltrimethylammonium 4-vinylbenzoate (CTVB) having a polymerizable counter ion, is maintained by polymerization of the polymerizable counter ion and the polymerized micelles are structurally stable against the temperature change in an aqueous solution (Langmuir, 1999, 15, pp 2726-2732). It has also been shown that such micelle structure of the polymerized surfactant can be obtained regardless what kind of a polymerized counter ion is used. However, the polymerized CTVB has different solubilities in different solvents and it is soluble in an organic solvent such as methyl alcohol but not in water, showing that the polymerized micelles cannot always be maintained in the solid form. Surfactants having a micelle structure have been used in the preparation of a porous inorganic material. For example, U.S. Pat. No. 5,220,101 describes a synthesis of a porous inorganic crystalline material comprising the steps of conducting a condensation reaction between cetyltrimethylammonium hydroxide, $NaAlO_2$ and $SiO_2$, and calcinating the condensation mixture at 550° C. The resulting porous inorganic crystalline material selectively adsorbs hexane over water in a water/hexane mixture when the surface of the porous material is modified by an inorganic surface modifier, chlorotrimethylsilane. Such selective adsorption of the surface-modified porous material has nothing to do with the surfactant used, the surfactant only providing the material with porosity.

SUMMARY OF THE INVENTION

It is, therefore, an object of the present invention to provide an organic or inorganic polymer gel having a surfactant-like porous structure which is capable of adsorbing and separating an ionic or water-soluble material in any solvent.

In accordance with one aspect of the present invention, there is provided an organic polymer gel obtained by polymerizing a monomer comprising an ionic surfactant moiety and a polymerizable organic counter ion in the presence of a cross-linking agent at or above the surfactant's critical micelle concentration.

In accordance with another aspect of the present invention, there is provided an inorganic polymer gel obtained by condensation polymerization of a surfactant and an inorganic compound having a reactive group which is condensible with the surfactant at or above the surfactant's critical micelle concentration.

BRIEF DESCRIPTION OF THE DRAWINGS

The above and other objects and features of the present invention will become apparent from the following description thereof, when taken in conjunction with the accompanying drawings, which respectively show.

DETAILED DESCRIPTION OF THE INVENTION

The inventive polymer gel comprises a backbone obtained by polymerizing monomer micelles comprising a surfactant moiety and a polymerizable counter ion in the presence of a cross-linking agent; or by condensating a surfactant and a condensible inorganic compound. The micelle surfactant portion is encased within the shell-like backbone. The polymer gel having a three dimensionally connected structure has a diameter which is about 2 times larger than that of the surfactant portion.

Figure 1:
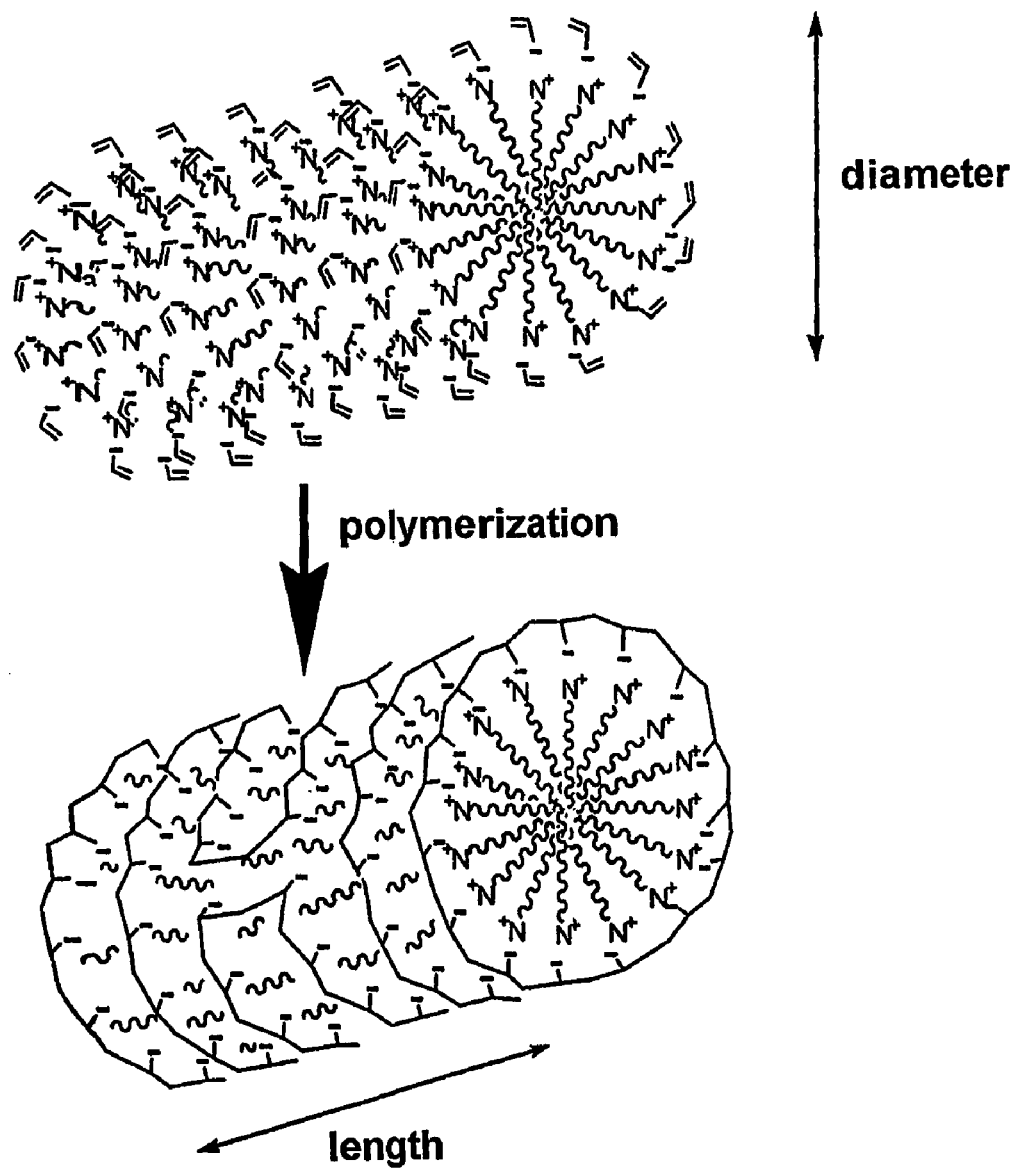
FIG. 1: a schematic view of a monomer assembly having a micelle structure prepared by binding a cationic surfactant with a vinyl monomer having an anionic functional group, and the inventive organic polymer gel obtained by polymerizing the monomer.

FIG. 1 shows a monomer micelle structure prepared by binding a cationic surfactant with a vinyl monomer having an anionic functional group, and an organic polymer gel obtained by polymerizing the monomer. The surfactant used in the present invention may be either cationic or anionic. Accordingly, in case an anionic surfactant is used, the anionic surfactant portion is bound with monomers having cationic functional groups in the structure of the FIG. 1.

As an embodiment for preparing a surfactant-like monomer used in the preparation of the inventive organic polymer gel, a polymerizable monomer having cationic surfactant activity may be obtained by reacting a cationic surfactant and a polymerizable compound having a reactive anion group as shown in Reaction Scheme 1:

Reaction Scheme 1

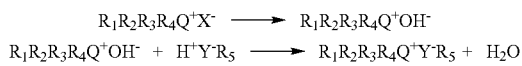

wherein $R_1R_2R_3R_4Q^+ X^-$ represents a cationic surfactant; $X^-$ is halogen or ethyl sulfate anion; Q is nitrogen or phosphorus; one of $R_1$, $R_2$, $R_3$ and $R_4$ is $C_{7-40}$ alkyl or aryl and the rests are each independently hydrogen or $C_{1-5}$ alkyl; and $R_5$ is $C_{2-50}$ alkyl or aryl having a polymerizable vinyl group or a polymerizable functional group containing oxygen and/or nitrogen atoms.

For example, a polymerizable monomer having surfactant activity can be obtained by dissolving a cationic alkyl ammonium surfactant in an alcohol, followed by ion-exchanging to obtain a modified alkyl ammonium hydroxide and then reacting the hydroxide with a polymerizable compound having an anionic functional group to form an ion pair.

Representative examples of the anionic functional group of the polymerizable compound may be $-COO^-$, $-SO_3^-$, $-OSO_3^{-2}$ or $-PO_3^{-2}$.

Representative examples of the polymerizable monomer having cationic surfactant activity are alkyltrimethylammonium acrylate, alkyltrimethylammonium, (meth)acrylate, alkyltrimethylammonium vinylacetate, alkyltrimethylammonium vinylbenzoate, alkyltrimethylammonium vinylphosphonate, alkyltrimethylammonium vinylsulfonate, alkyltrimethylammonium vinylbenzenesulfonate, alkyltriethylammonium acrylate, alkyltriethylammonium (meth) acrylate, alkyltriethylammonium vinylacetate, alkyltriethylammonium vinylbenzoate, alkyltriethylammonium vinylphosphonate, alkyltriethylammonium vinylsulfonate and alkyltriethylammonium vinylbenzenesulfonate, wherein the alkyl is preferably $C_{7-40}$ alkyl, more preferably $C_{10-16}$ alkyl.

As another embodiment for preparing a surfactant-like monomer used in the preparation of the inventive organic polymer gel, a polymerizable monomer having anionic surfactant activity may be obtained by reacting an anionic surfactant and a polymerizable compound having a cationic group as shown in Reaction Scheme 2:

Reaction Scheme 2

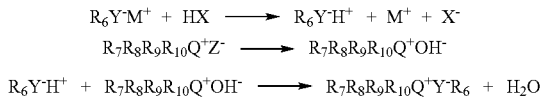

wherein $R_6Y^-M^+$ represents an anionic surfactant; $R_6$ is $C_{7-40}$ alkyl or aryl; M is an alkali or alkaline earth metal, X and Z are each halogen; one of $R_7$, $R_8$, $R_9$ and $R_{10}$ is $C_{2-50}$ alkyl or aryl having a polymerizable vinyl group or a polymerizable functional groups containing oxygen and/or nitrogen atoms and the rests are each independently hydrogen or $C_{1-5}$ alkyl.

Representative examples of the polymerizable monomer having anionic surfactant activity are vinylpyridinium alkylcarboxylate, vinylpyridinium alkylbenzoate, vinylpyridinium alkylsulfonate, vinylpyridinium benzenesulfonate, vinylpyridinium alkylphosphonate, allyltrimethylammonium alkylcarboxylate, allyltriethylammonium alkylcarboxylate, allyltrimethylammonium alkylsulfonate, allyltriethylammonium alkylsulfonate, allyltrimethylammonium alkylphosphonate and allyltriethylammonium alkylphosphonate, wherein the alkyl is $C_{7-40}$ alkyl.

The inventive organic polymer gel has a micelle structure produced by combining a surfactant having hydrophilic groups with a polymerizable organic compound having a functional group to prepare a monomer having surfactant activity and then polymerizing the monomer in the presence of a cross-linking agent at or above the surfactant's critical micelle concentration. In the micelle structure, the hydrophobic groups of the surfactant molecules are inwardly oriented and the polymerizable compound bound to the hydrophilic group of the surfactant is outwardly extended.

The inventive organic polymer gel may be obtained by a conventional polymerization procedure under a suitable condition. A cross-linking agent is also added in the polymerization to provide a 3-dimensionally stable structure of the polymer gel. If a cross-linking agent is not added, the produced polymer gains adsorbing capacity, but does not form a 3-dimensionally stable structure of the polymer gel, and thus is difficult to be recycled after use.

As one embodiment for preparing the inventive organic polymer gel, the inventive organic polymer gel may be obtained by: dissolving the inventive surfactant-like monomer in water, an alcohol or a mixture thereof; adding, optionally, a catalyst and/or a polymerization initiator; and adding 0.01 to 5 mol, preferably 0.06 to 5 mol of a cross-linking agent based on a mol of the monomer, followed by heating the resulting mixture for 2 to 12 hours at room temperature to 100° C.

Any of the conventional cross-linking agents may be used in the present invention and preferred is a compound having at least two double bonds. Examples of the cross-linking agent that may be used in the present invention include methylenebisacrylamide (MBA), divinylbenzene, trimethylolpropane ethoxylate (1/3EO/OH) methylether diacylate (TPE-1), trimethylolpropane ethoxylate (7/3EO/OH) methylether diacylate (TPE-7), trimethylolpropane ethoxylate (14/3EO/OH) methylether diacylate (TPE-14), trimethylolpropane triacylate, trimethylpropane trimethacylate, pentaerythritol triacrylate, pentaerythritol trimethacrylate, pentaerythritol tetraacrylate, pentaerythritol tetramethacrylate, trimethylolpropane propoxylate triacrylate, trimethylolpropane propoxylate trimethacylate, trimethylolpropane ethoxylate triacrylate, trimethylolpropane ethoxylate trimethacrylate, glycerol propoxytriacrylate, glycerol propoxytrimethacrylate, dipentaerythritol monohydroxy pentaacrylate, dipentaerythritol monohydroxy pentamethacrylate, $C_{6-12}$ hydrocarbon diol diacrylates, $C_{6-12}$ hydrocarbon diol dimethacrylates and a mixture thereof. Among these, methylenebisacrylamid (MBA), divinylbenzene, trimethylolpropane ethoxylate (1/3EO/OH) methylether diacylate (TPE-1), trimethylolpropane ethoxylate (7/3EO/OH) methylether diacylate (TPE-7) and trimethylolpropane ethoxylate (14/3EO/OH) methylether diacylate (TPE-14) are preferred.

Further, the present invention provides an inorganic polymer gel prepared by condensation-polymerization of a surfactant with an inorganic compound having condensable groups at or above the surfactant's critical micelle concentation.

Any of non-ionic surfactants as well as the ionic surfactants used in the inventive organic polymer gel may be used as the surfactant, among which ionic surfactants are preferred.

Any of the monomers used in conventional sol-gel processes may be used as the monomer for the inventive inorganic polymer gel, and examples of the monomer include tetramethylorthosilicate, tetraethylorthosilicate, titanium tetraethoxide, aluminum isopropoxide, trimethylborate, chlorodimethylalkylsilane and sodium silicate.

For the synthesis of the inorganic polymer gel, the reaction condition in terms of temperature, reaction time, composition ratio is not particularly limited and as a preferred embodiment of the synthesis thereof, the inventive inorganic polymer gel may be obtained by: dissolving a cetyltrimethylammoniumbromide in water; adding successively hydrochloric acid, tetraethylorthosilicate and, optionally, ethyl alcohol thereto with stirring; and stirring the mixture for 0.1 to 100 hours, preferably 0.1 to 30 hours at 0 to 120° C., preferably at room temperature to 100° C. In this reaction, 0.05 to 0.5 mole of cetyltrimethylammoniumbromide, 2 to 10 mole of water, 1 mole of tetraethylorthosilicate and $1\times10^{-4}$ to $1.8\times10^{-2}$ mole of hydrochloric acid are preferably used.

The prior porous inorganic gel preparation requires a calcinating step at about 550° C. in order to form a porous gel whose pore size ranges from several Å to several hundreds Å, and thus, during the calcinating process, organic materials used as surfactants are burnt off. In contrast, the inventive porous inorganic gel maintains an amorphous solid phase, and a calcinating step is not required in the production of a porous structure capable of adsorbing materials.

The present invention further provides a method for separating an ionic or water-soluble material from a solution containing the ionic or water-soluble material using the inventive organic or inorganic polymer gel having the micelle structure of the surfactant.

The inventive organic or inorganic polymer gel having the micelle structure does not dissolve in a nonpolar or polar solvent such as water or an alcohol, and is capable of adsorbing ionic materials, e.g., methyl orange, methyl red, methyl green, rhodamine B or methyl violet and water-soluble materials, e.g., bromocresol purple or phenol red dissolved in an aqueous solution.

Since the inventive organic or inorganic polymer gel can also be subjected to facile adsorption-desorption processes using a suitable solvent to remove a specific component from a mixture of various components. Thus, the problem of the prior adsorbents which are difficult to regenerate can be overcome by using the inventive polymer gel in repetitive adsorption-desorption processes.

The present invention is further described and illustrated in Examples provided below, which are, however, not intended to limit the scope of the present invention.

EXAMPLE

Synthesis of DTA (Decyltrimethylammonium) Derivatives

Preparation 1-1

Synthesis of Decyltrimethylammonium Hydroxide (DTAOH, n=10)

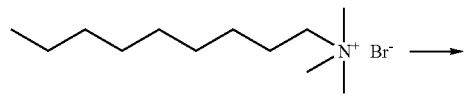

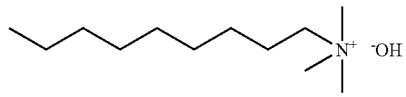

Amberlit IRA 400 (Fluka) of the chloride form was charged to a column, converted to the —OH form using a NaOH (3.2 g, 80 mmol) solution, and then the column was thoroughly washed with distilled water and methanol. Decyltrimethylammonium bromide (DTAB) (8.41 g, 30 mmol) dissolved in 100 ml of methanol was passed through the column to obtain decyltrimethylammonium hydroxide (DTAOH) by flash column chromatography. The ion exchange was confirmed using a pH test paper (Advantec) and pH meter (Fisher 10). Methanol was distilled off under a reduced pressure to obtain the title compound of a light yellow color.

Yield: 98.2% (6.4 g) 1H-NMR(300 MHz, D2O): δ 3.35~3.13(m, 2H), 3.07(s, 9H), 1.71(s, 1H), 1.41~1.02(m, 28H), 0.79(t, J=6.4 Hz, 3H) IR(KBr): 3426.89(7.9227), 3017.09(48.4661), 2920.66(3.001), 2852.20(5.7716), 1666.20(6.4682), 1483.96(13.2627), 1290.14(17.0867), 1073.19(25.3259)

Preparation 1-2

Synthesis of Decyltrimethylammonium Acrylate (DTAA)

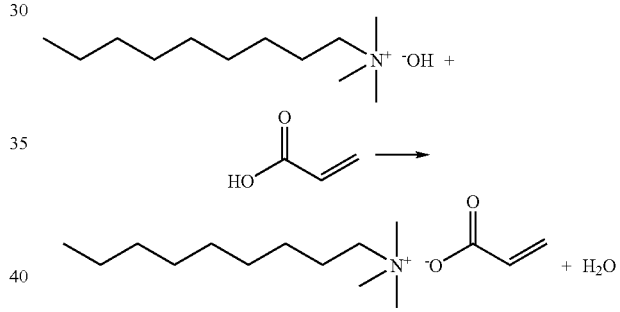

Decyltrimethylammonium hydroxide (DTAOH) (2 g, 9.2 mmol) obtained in Preparation 1-1 was dissolved in a small amount of MeOH, acrylic acid (0.66 g, 9.2 mmol) was added thereto with stirring at room temperature. The solvent was distilled off under a reduced pressure to obtain the title compound as a light yellow viscous liquid.

Yield: 92.8% (2.32 g) 1H-NMR(200 MHz, D2O): δ 6.16(s, 1H), 6.15(d, J=11.7 Hz, 1H), 5.79(dd, J=8.9, 3.0 Hz, 1H), 3.33~3.25(m, 2H), 3.08(s, 9H), 1.34~1.27(m, 16H), 0.85(t, J=6.8 Hz, 3H) IR(KBr): 3412.42(10.2284), 3025.76 (39.6547), 2924.52(4.5730), 2855.10(7.4320), 1718.26(23.9922), 1634.38(23.9201), 1567.84(19.5638), 1483.96(39.3923), 1415.49(37.5739), 1345.11(58.2443), 1288.22(55.7359), 1219.76(47.8883)

Preparation 1-3

Synthesis of Decyltrimethylammonium Methacrylate (DTAM)

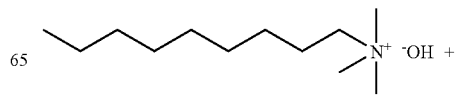

-continued

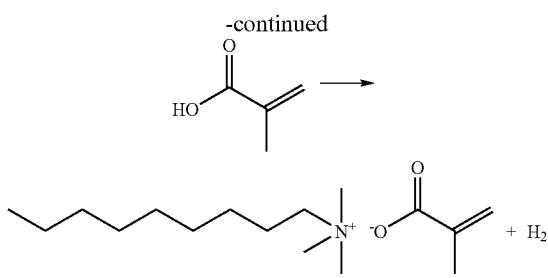

The procedure of Preparation 1-2 was repeated except that methacrylic acid (0.79 g, 9.2 mmol) was used instead of acrylic acid to obtain the title compound as a light yellow viscous liquid.

Yield: 92.8% (2.32 g) 1H-NMR(300 MHz, D2O): δ 5.87(s, 1H), 5.52(s, 1H), 3.34-3.25(m, 2H), 3.08(s, 9H), 1.88(s, 3H), 1.34~1.27(m, 16H), 0.85(t, J=6.7 Hz, 3H) IR(KBr): 3412.42(40.2929), 2925.48(7.0345), 2855.10(18.3273), 1696.09(31.5769), 1631.48(36.4455), 1566.88(22.3890), 1482.99(35.2340), 1374.03(42.4950), 1291.11(55.1852), 1195.65(39.2054), 1002.80(67.0382)

Preparation 1-4

Synthesis of Decyltrimethylammonium Vinylphosphonate (DTAV)

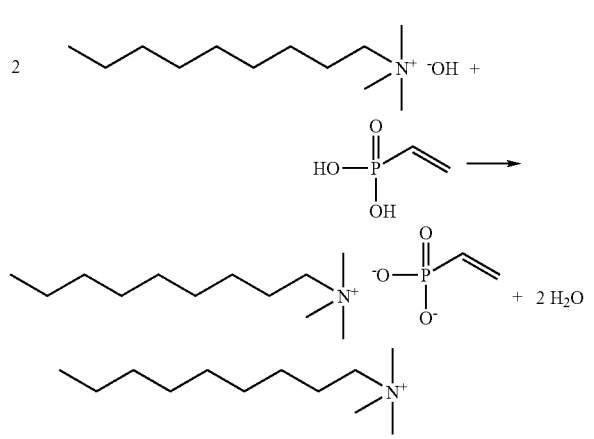

The procedure of Preparation 1-2 was repeated except that vinylphosphonic acid (1 g, 9.2 mmol) was used instead of acrylic acid to obtain the title compound as a white solid.

Yield: 96.2% (2.56 g) 1H-NMR(300 MHz, D2O): δ 6.26~5.84(m, 3H), 3.32~3.25(m, 4H), 3.07(s, 18H), 1.33~1.26(m, 56H), 0.84(t, J=7.0 Hz, 6H) IR(KBr): 3438.46(80.5586) 2921.63(27.9059), 2853.17(40.6389), 2284.27(79.3498), 1670.05(78.4968), 1486.85(57.0407), 1400.07(71.9168), 1143.58(74.7979)

Synthesis of CTA (Cetyltrimethylammonium) Derivatives

Preparation 2-1

Synthesis of Cetyltrimethylammonium Hydroxide (CTAOH)

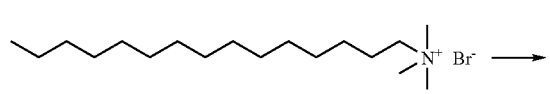

-continued

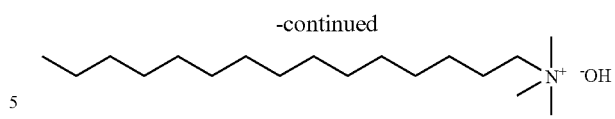

The procedure of Preparation 1-1 was repeated except that cetyltrimethylammonium bromide (CTAB) (3.64 g, 10 mmol) was used instead of decyltrimethylammonium bromide (DTAB) (8.41 g, 30 mmol) to obtain the title compound as a white solid.

Yield: 99.6% (3.00 g) 1H-NMR(300 MHz, D2O): δ 3.35~3.13(m, 2H), 3.07(s, 9H), 1.71(s, 1H), 1.41~1.02(m, 28H), 0.79(t, J=6.4, 3H) IR(KBr): 3418.21(34.2576), 3016.12(55.2001), 2917.77(0.0349), 2849.31(0.6305), 1658.48(39.2788), 1462.74(9.3150), 1079.94(84.5373)

Preparation 2-2

Synthesis of Cetyltrimethylammonium Acrylate (CTAA)

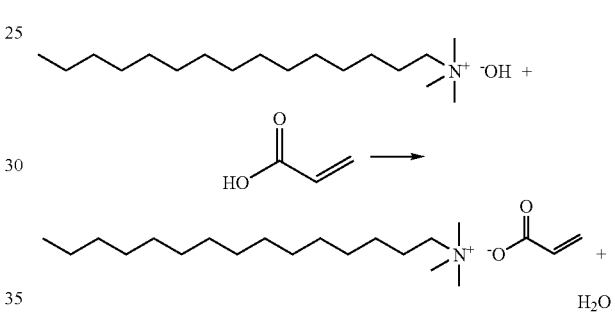

Cetyltrimethylammonium hydroxide (CTAOH) (12.55 g, 41.63 mmol) obtained in Preparation 2-1 was dissolved in a small amount of MeOH, and acrylic acid (3 g, 41.63 mmol) was added thereto with stirring at room temperature, to obtain the title compound as a white solid.

Yield: 98.0% (3.0 g) 1H-NMR(300 MHz, D2O): δ 6.16~5.97(m, 2H), 5.54(dd, J=9.0, 2.5 Hz, 1H), 3.27(t, J=8.5 Hz, 2H), 3.11(s, 9H), 1.30(s, 28H), 0.89(t, J=6.3 Hz, 3H) IR(KBr): 3397.96(49.0630), 3017.09(63.0904), 2916.81(1.5020), 2849.31(4.2190), 1636.30(36.5263), 1559.17(5.0628), 1486.85(30.5197), 1472.38(33.5079), 1462.74(34.9607), 1429.96(36.1399), 1359.57(45.6529), 1273.75(79.9811)

Preparation 2-3

Synthesis of Cetyltrimethylammonium Metacrylate (CTAM)

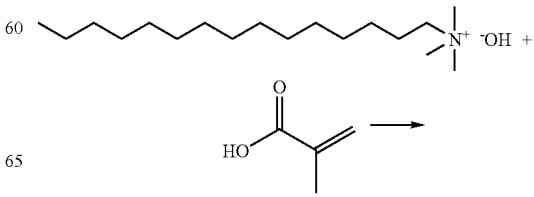

-continued

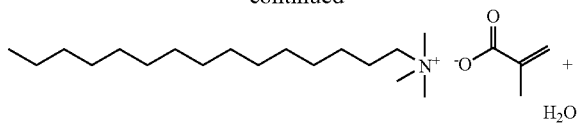

Cetyltrimethylammonium hydroxide (CTAOH) (17.78 g, 0.059 mmol) obtained in Preparation 2-1 was dissolved a small amount of MeOH, and metacrylic acid (5.08 g, 0.059 mmol) was added thereto with stirring at room temperature, to obtain the title compound as a white solid.

Yield: 97.7% (21.3 g) 1H-NMR(300 MHz, D2O): δ 5.78(s, 1H), 5.29(s, 1H), 3.34~3.28(m, 2H), 3.11(s, 9H), 1.88(s, 3H), 1.49~1.10(m, 28H), 0.90(t, J=6.7 Hz, 3H) IR(KBr): 3428.81(87.0734), 3017.09(70.4062), 2917.77(1.1776), 2849.31(4.6518), 1723.09(50.2869), 1635.34(55.9103), 1556.27(42.4368), 1461.78(37.4151), 1367.28(53.2969), 1229.40(66.0929)

Preparation 2-4

Synthesis of Cetyltrimethylammonium Vinylphosphonate(CTAV)

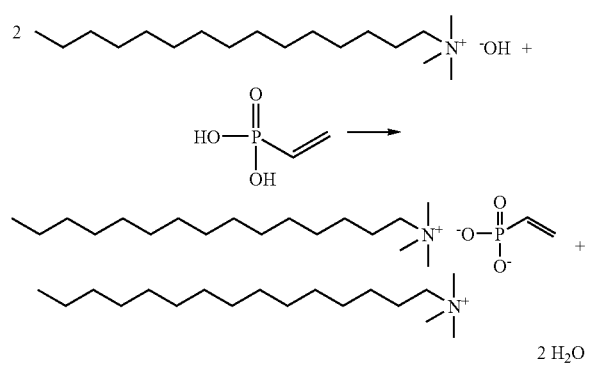

Cetyltrimethylammonium hydroxide (CTAOH) (19.5 g, 64.66 mmol) obtained in Preparation 2-1 was dissolved in a small amount of MeOH, and vinylphophonic acid (5.08 g, 0.059 mmol) was added thereto with stirring at room temperature, to obtain the title compound as a white solid.

Yield: 99.8% (25.93 g) 1H-NMR(300 MHz, D2O): δ 6.23~6.06(m, 1H), 5.89~5.58(m, 2H), 3.34~3.28(m, 4H), 1.36~1.30(m, 56H), 0.89(t, J=6.8 Hz, 3H) IR(KBr): 3397.96 (48.8795), 3017.09(63.1767), 2916.81(1.5028), 2849.31(4.2191), 1636.3.0(36.3330), 1559.17(5.0376), 1486.85(30.3771), 1472.38(33.3534), 1462.74(34.8010), 1429.96(35.9797), 1359.57(45.4640), 1273.75(79.6787)

Synthesis of Organic Polymer Gels Using a Cross-linking Agent

Example 1

Synthesis of Cross-linked Polydecyltrimethylammonium Acrylate (PDTAA)

Figure 2:
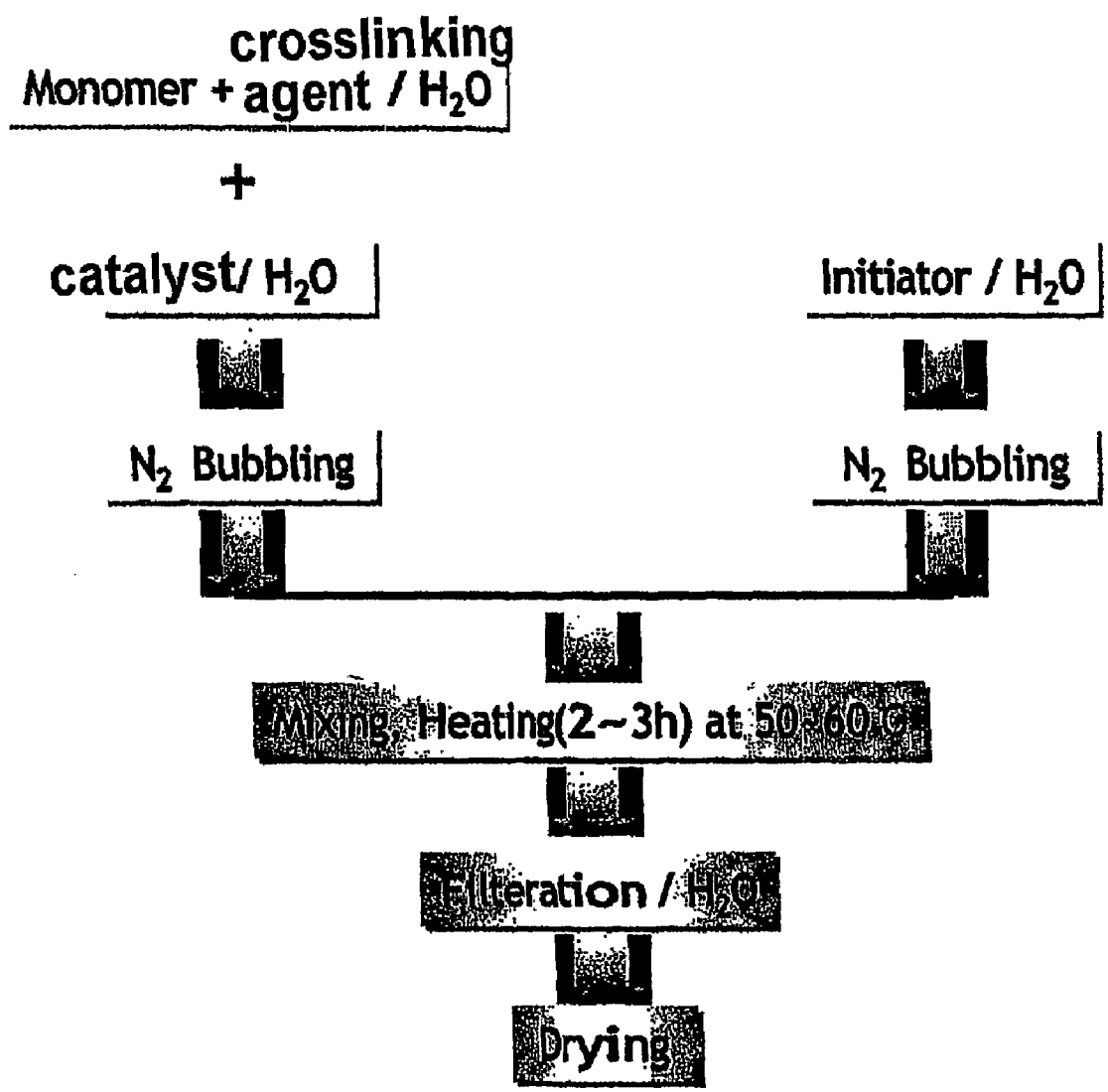
FIG. 2: a schematic representation of the polymerization sequence of the inventive organic polymer gel.

Referring to the reaction scheme shown in the FIG. 2, DTAA (1 g) obtained in Preparation 1-2 and MBA (12 wt %, 0.12 g), a cross-linking agent, were placed in a 100 ml round-bottom flask and dissolved in deionized water. A catalyst, TEMED (N,N,N',N'-tetramethylethylened diamine) (50 μl) dissolved in 4.5 ml of water was added thereto and residual oxygen was removed therefrom using nitrogen. A radical initiater, VA044 (2,2'-azobis[(2-(2-imidazolin-2-yl) propane)]dihydrochloride) (11 mg, 11 wt %) dissolved in water(1 ml) was added to the above solution and stirred with heating for 2 to 3 hours at a temperature in the range of 60 to 70° C. The resulting polymer gel was filtered, washed with distilled water to remove unreacted materials and dried to obtain the title compound as a white polymer gel.

Yield: 65.23% (0.73 g) IR(KBr): 3523.31(87.7779), 3331.43(88.4922), 2918.73(78.7600), 2851.24(81.8506), 1670.05(83.6830), 1558.20(82.9445)

Example 2

Synthesis of Cross-linked Polydecyltrimethylammonium Methacrylate (PDTAM)

The procedure of Example 1 was repeated except that DTAM (1 g) obtained Preparation 1-3 was used instead of DTAA (1 g) to obtain the title compound as a white polymer gel.

Yield: 43.75% (0.49 g) IR(KBr): 3464.49(71.7115), 2917.77(40.1726), 2851.24(54.4546), 1670.05(68.6852), 1551.45(60.7148), 1486.85(62.6620), 1395.25(74.2171)

Example 3

Synthesis of Cross-linked Polydecyltrethylammonium Vinylphosphonate (PDTAV)

The procedure of Example 1 was repeated except that DTAV (1 g) obtained Preparation 1-4 was used instead of DTAA (1 g) to obtain the title compound as a white polymer gel.

Yield: 25.3% (0.28 g) IR(KBr): 3311.18(45.4196), 2925.48(65.1987), 1655.59(27.0300), 1530.24(37.8628), 1378.85(85.7463), 1117.55(64.1805)

Example 4

Synthesis of Cross-linked Polycetyltrimethylammonium Acrylate (PCTAA)

The procedure of Example 1 was repeated except that CTAA (1 g) obtained Preparation 2-2 was used instead of DTAA (1 g) to obtain the title compound as a white polymer gel.

Yield: 68.75% (0.77 g) IR(KBr): 3421.10(46.2275), 2917.77(16.0931), 2849.31(21.1874), 1653.66(37.7177), 1559.17(26.7762), 1486.85(38.1749), 1406.82(45.6463)

Example 5

Synthesis of Cross-linked Polycetyltrimethylammonium Methacrylate (PCTAM)

The procedure of Example 1 was repeated except that CTAM (1 g) obtained Preparation 2-3 was used instead of DTAA (1 g) to obtain the title compound as a white polymer gel.

Yield: 96.43% (1.08 g) IR(KBr): 3433.64(68.7908), 2919.70(50.0128), 2851.24(62.3456), 1655.59(67.8298), 1560.13(61.5426), 1396.21(80.4738)

Example 6

Synthesis of Cross-linked Polycetyltrimethylammonium Vinylphosphonate (PCTAV)

The procedure of Example 1 was repeated except that CTAV (1 g) obtained Preparation 2-4 was used instead of DTAA (1 g) to obtain the title compound as a white polymer gel.

Yield: 27.9% (0.31 g) IR(KBr): 3512.70(78.0787), 3326.61(77.4890), 2917.77(59.1447), 2849.31(63.5510), 2363.34(85.6854), 1653.66(63.5360), 1534.10(71.8851), 1055.84(77.6701)

Examples 7 to 10

The procedure of Example 5 was repeated except that the cross-linking agent MBA was used in an amount of 0.01 g (1 wt %), 0.03 g (3 wt %), 0.06 g (6 wt %) and 0.09 g (9 wt %), respectively, to obtain the cross-linked PCTAM in an amount of 0.54 g (Yield: 53.36%), 0.61 g (Yield: 59.07%), 0.59 g (Yield: 55.26%) and 0.59 g (Yield: 53.82), respectively.

Examples 11 to 13

The procedure of Example 1 was repeated except that TPE-1 (6 wt %, 0.06 g), TPE-7 (6 wt %, 0.06 g) and TPE-14 (6 wt %, 0.06 g), respectively, were used instead of MBA to obtain the cross-linked PCTAM in an amount of 1.04 g (Yield: 98.4%), 1.03 g (Yield: 97.13%) and 0.3 g (Yield: 28.3%), respectively.

Comparative Example 1

Synthesis of Cross-linked Poly Methacrylic Acid (PMA)

The procedure of Example 1 was repeated except that methacrylic acid (1 g) was used instead of DTAA (1 g) to obtain the title compound as a transparent polymer gel, i.e., a polymer gel without a surfactant.

Yield: 98% (1.1 g) IR(KBr): 3566.70(50.5711), 3224.40 (55.1122), 2999.73(57.1136), 2571.61(84.9079), 2359.48(87.9636), 1717.30(27.8736), 1486.85(60.3465), 1389.46(61.4524), 1267.00(42.8801), 1172.51(32.4054)

Comparative Example 2

Synthesis of Uncross-linked PCTAM

The procedure of Example 1 was repeated except that the cross-linking agent MBA was not used to obtain the title compound polymer.

Yield: 68.24% (0.68 g)

Synthesis of Inorganic Polymer Gels

Example 14

11.7 g of cetyltrimethylammonium bromide (CTABr) was dissolved in 320 ml of water and then 42.5 ml of HCl was slowly added thereto with stirring. 44.6 mg of tetraethylorthosilicate (TEOS) was slowly added to the resulting solution, stirred for 1 to 2 hours, and then the mixture was placed in a 100° C. oven. After 13 hours, the mixture was repeatedly washed with water, neutralized with a small amount of 0.1M NaOH, washed again with water until CTABr was not detected and then dried to obtain 12.7 g of an inorganic polymer gel.

Example 15

The procedure of Example 14 was repeated except that 237 ml of 25% cetyltrimethylammonium chloride (CTACl) in water was used instead of cetyltrimethylammonium bromide (CTABr) to obtain an inorganic polymer gel.

Example 16

6.2 g of CTABr was dissolved in 45 ml of water and then added 2.2 g of tetramethylammonium hydroxide (TMAOH) before adding 13.9 ml of TEOS thereto. The resulting solution was stirred for about 3 hours, left at room temperature overnight, and then placed in a 100° C. oven for 24 hours. The resulting solution was repeatedly washed with water until CTABr was not detected and then dried to obtain an inorganic polymer gel.

Example 17

The procedure of Example 14 was repeated except that the amount of HCl used was 20 ml to obtain an inorganic polymer gel.

Example 18

The procedure of Example 14 was repeated except that decyltrimethylammonium bromide (DTABr) was used instead of cetyltrimethylammonium bromide (CTABr) to obtain an inorganic polymer gel.

Example 19

2.25 g of sodium dodecylsulfate was dissolved in 90 ml of water, 11.2 ml of TEOS and 15.9 ml of HCl were added thereto, stirred for 10 hours at 60° C., and neutralized with 0.5M NaOH. Then, the resulting solution was heated for 12 hours at 100° C., washed several times with water and dried to obtain an inorganic polymer gel.

Example 20

5.24 g of dodecylbenzenesulfonic acid was dissolved in 160 ml of water, 22.4 ml of TEOS and 21.3 ml of HCl were added thereto and agitated for 10 hours at room temperature. Then, the resulting solution was washed several times with water and methyl alcohol, heated for 12 hours at 100° C., washed several times with water and dried to obtain an inorganic polymer gel.

Adsorptivity

Experimental Example 1

Ionic dye adsorptivities of the surfactant CTAOH (Preparation 2-1), cross-linked PMA (Comparative Example 1) and the polymer surfactant PCTAM (Comparative Example 2) were measured and compared. Each material (30 mg) was added to 3 ml of 0.1 mM aqueous methyl orange solution to measure the absorbance thereof with a UV-VIS spectrometer. The results are shown in FIGS. 3 to 5.

Figure 3:
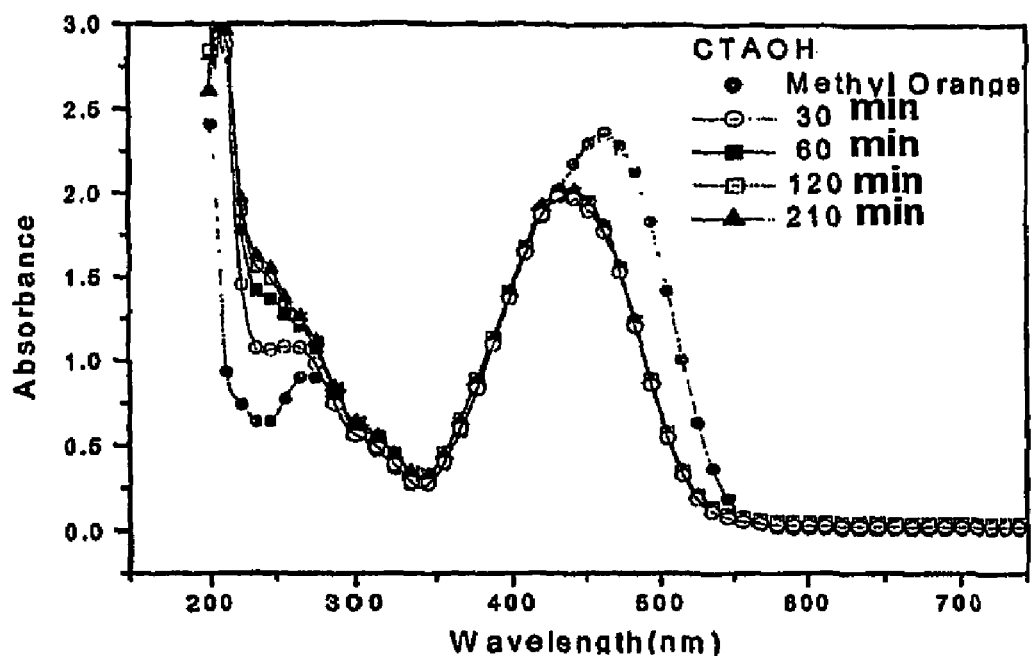
FIGS. 3 to 5: ultra violet-visible (UV-VIS) spectra of the inventive surfactant prepared in Preparation 2-1 and the comparative surfactants prepared in Comparative Examples 1 and 2 (aqueous methyl orange)

As shown in FIG. 3, in case of CTAOH, the absorbance at 450 nm decreased a little in 30 minutes but did not decrease further after 30 minutes. The surfactant CTAOH was dispersed in the solution and the absorbed dye was also uniformly dispersed in the solution.

Figure 4:
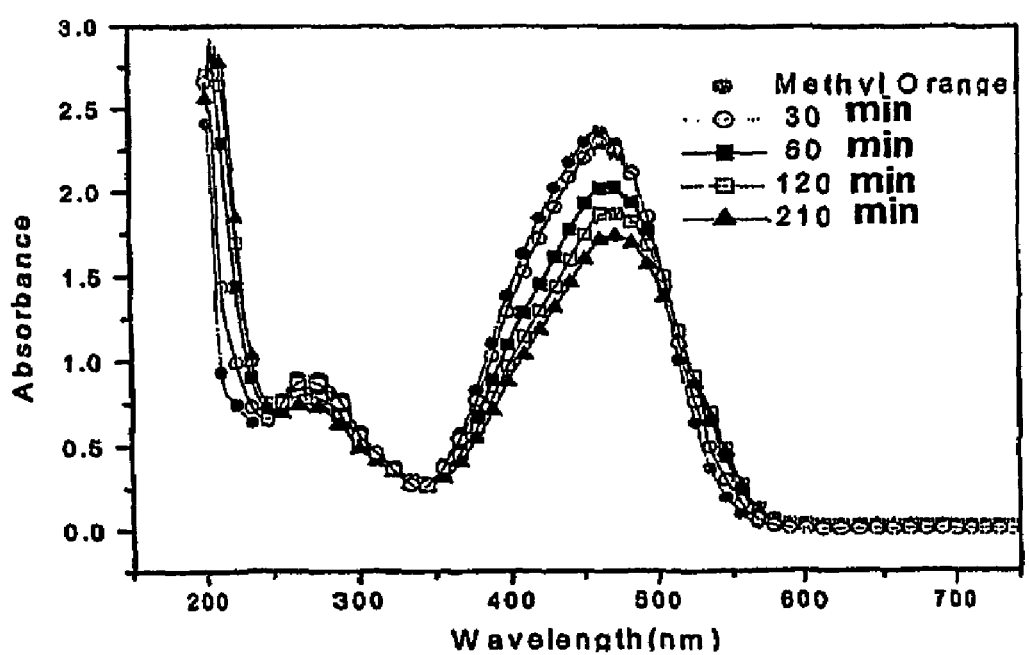

As shown in FIG. 4, the absorbance of the cross-linked PMA solution decreased with time but PMA absorbed water as well as dye after a sufficient time period.

Figure 5:
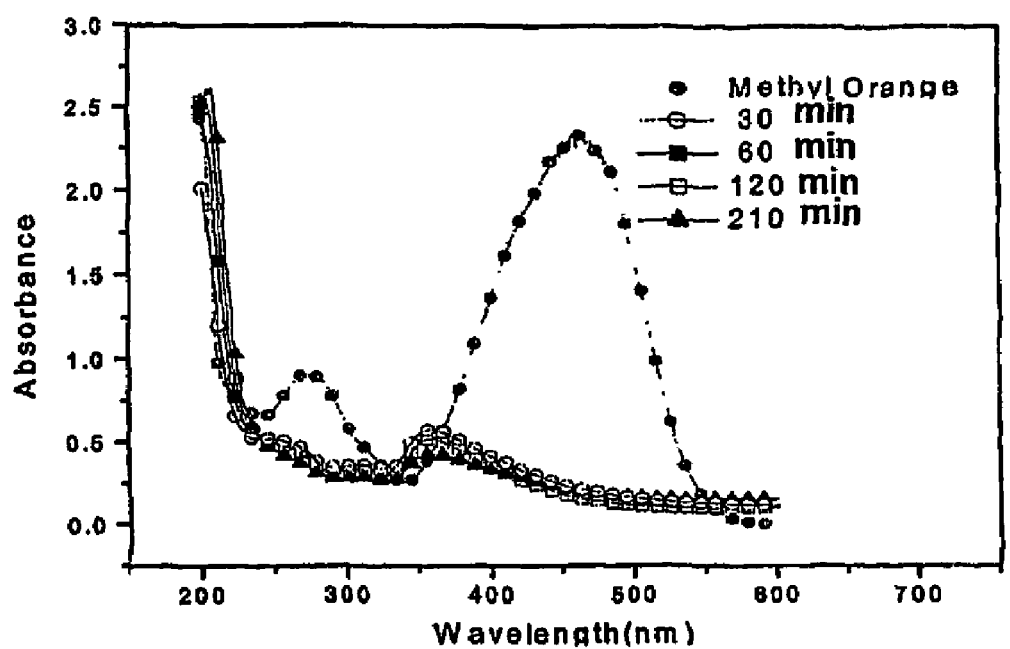

As shown in FIG. 5, the absorbance of the uncross-linked PCTAM solution decreased rapidly after 30 minutes. As the white polymer absorbed the dye, it became dark orange while the solution concentration of the dye decreased. When the polymer having adsorbed dye was taken out of the solution, dried and added to methyl alcohol, it is released the adsorbed dye but the uncross-linked PCTAM was also dissolved in methyl alcohol.

The results of Experimental Example 1 suggest that the uncross-linked polymer surfactant PCTAM adsorbs the dye due to the micelle structure of the surfactant and also to the presence of the double bond in the monomer, such micelle structure can be fixed into a 3 dimensional structure by way of cross-linking.

Experimental Example 2

Dye Adsorptivity on the Size of the Surfactant

Figure 6:
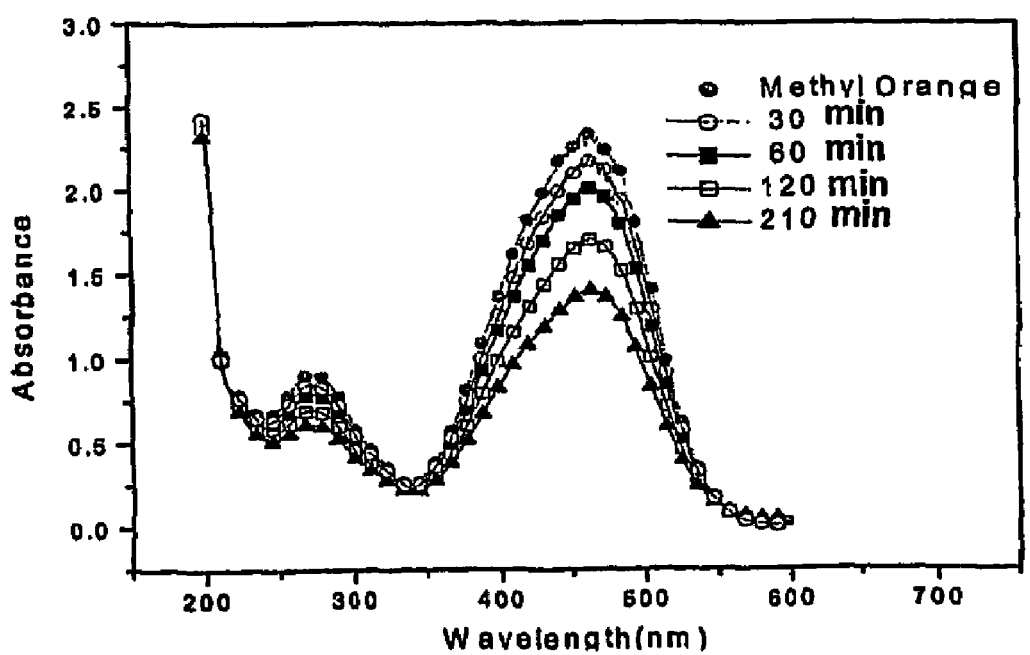
FIGS. 6 and 7: UV-VIS spectra of the inventive organic polymer gels prepared in Examples 1 and 4 (aqueous methyl orange)

The dependency of dye adsorptivity of the cross-linked polymer gel on the length of the alkyl chain was measured. Each of the cross-linked polymer gels PDTAA (C-10) 30 mg and PCTAA (C=16) 30 mg was added to 3 ml of 0.1 mM aqueous methyl orange and the absorbance thereof was measured. The results are shown in FIGS. 6 to 7.

Figure 7:
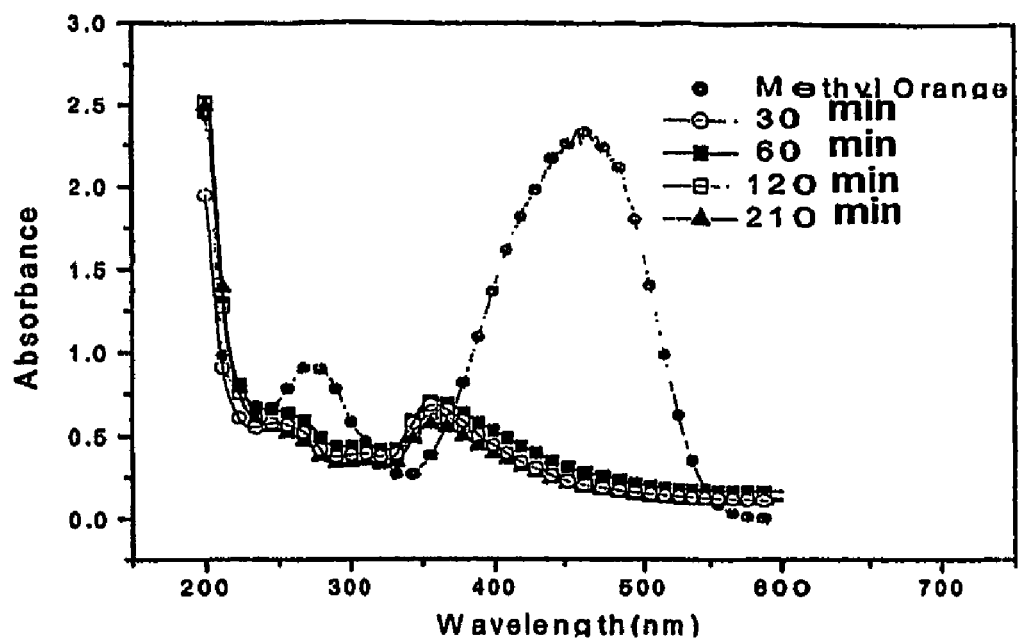

PDTAA absorbed the dye at a uniform rate (See FIG. 6), while PCTAA rapidly absorbed the dye within 30 minutes after the polymer gel was added to the dye solution, and the adsorption rate become uniform thereafter (See FIG. 7). Thus, PCTAA having a longer alkyl chain absorbed the dye more rapidly.

Experimental Example 3

Ionic Dye Adsorptivity and the Surfactant Monomer

Experimental Example 3-1

Figure 8:
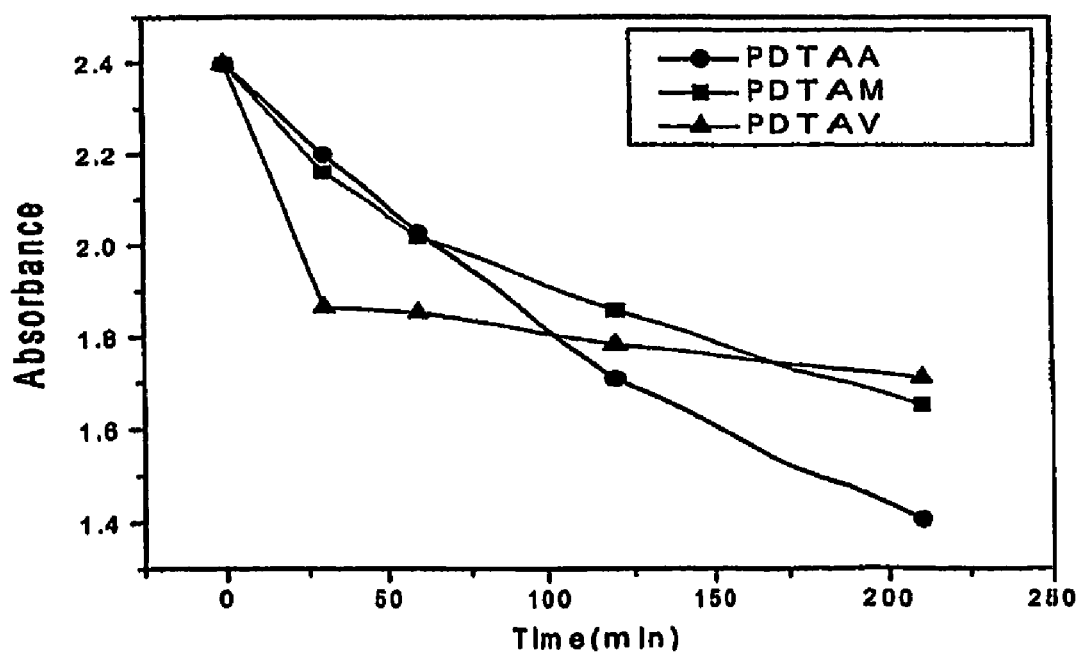
FIG. 8: UV-VIS spectra of the surfactant monomers of the inventive polymer gels, PDTAA, PDTAM and PDTAV (aqueous methyl orange)
Figure 9:
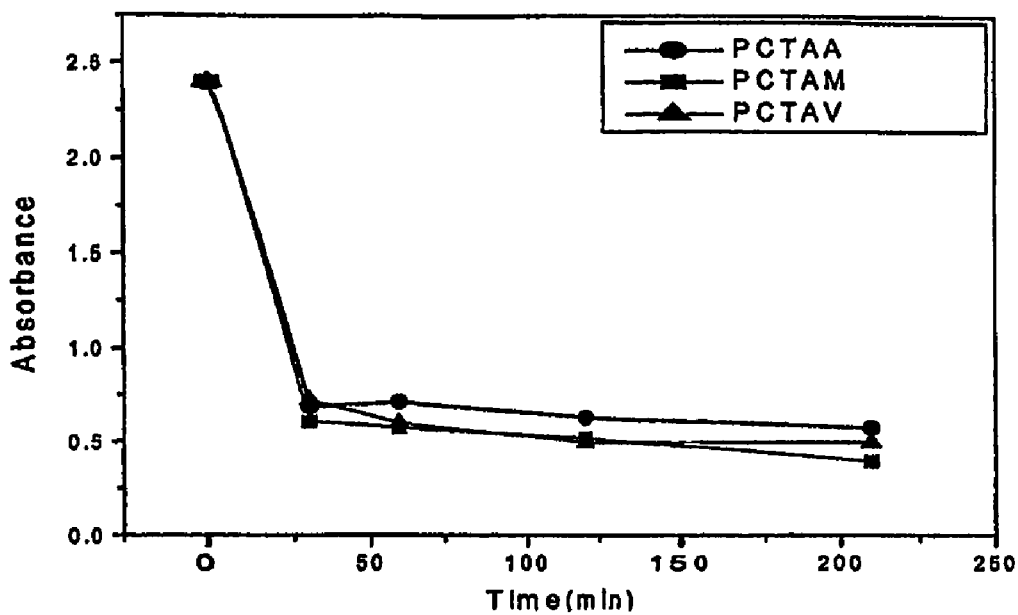
FIG. 9: UV-VIS spectra of the surfactant monomers of the inventive polymer gels, PCTAA, PCTAM and PCTAV (aqueous methyl orange)
Figure 10:
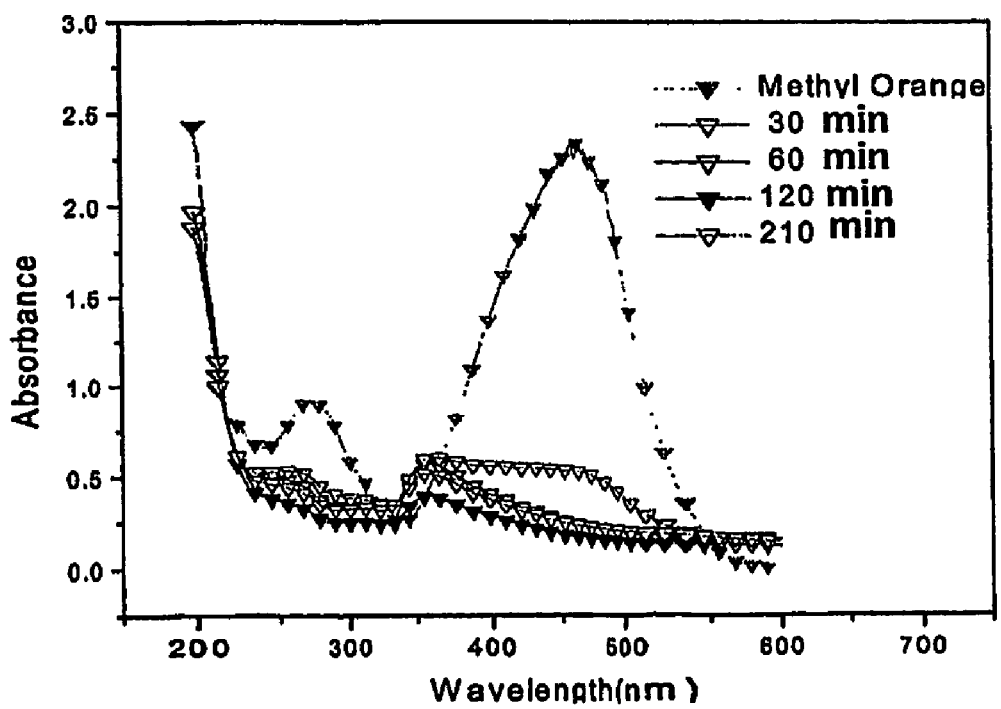
FIGS. 10 to 13: UV-VIS spectra of the inventive organic polymer gels prepared in Examples 5 and 11 to 13 (aqueous methyl orange)
Figure 11:
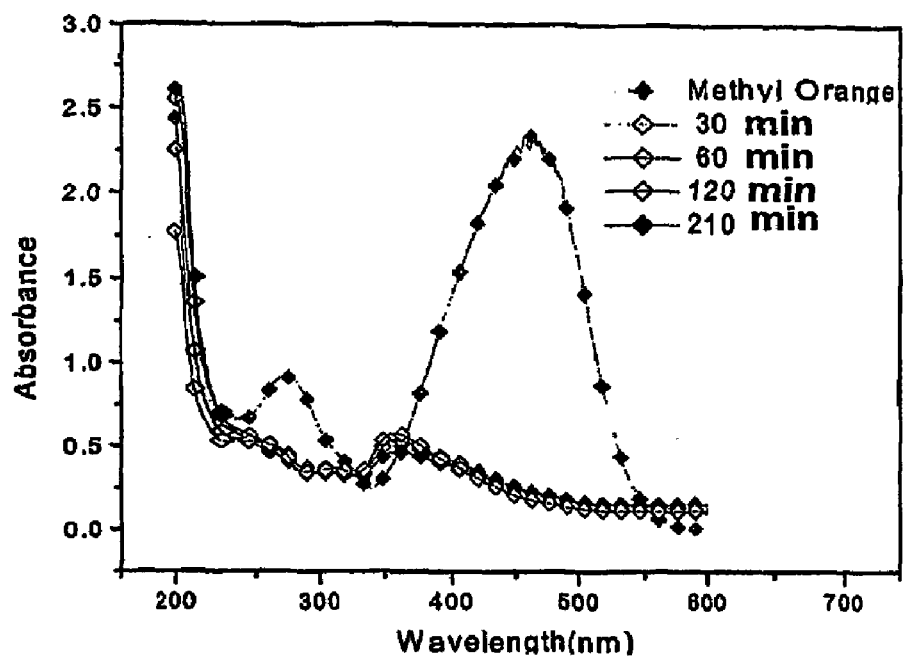
Figure 12:
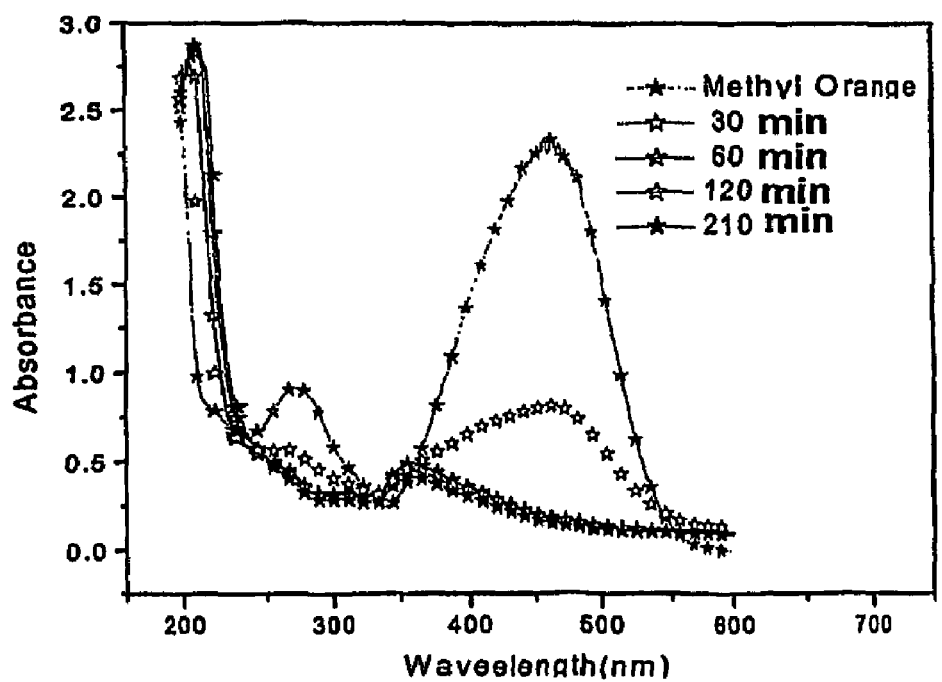
Figure 13:
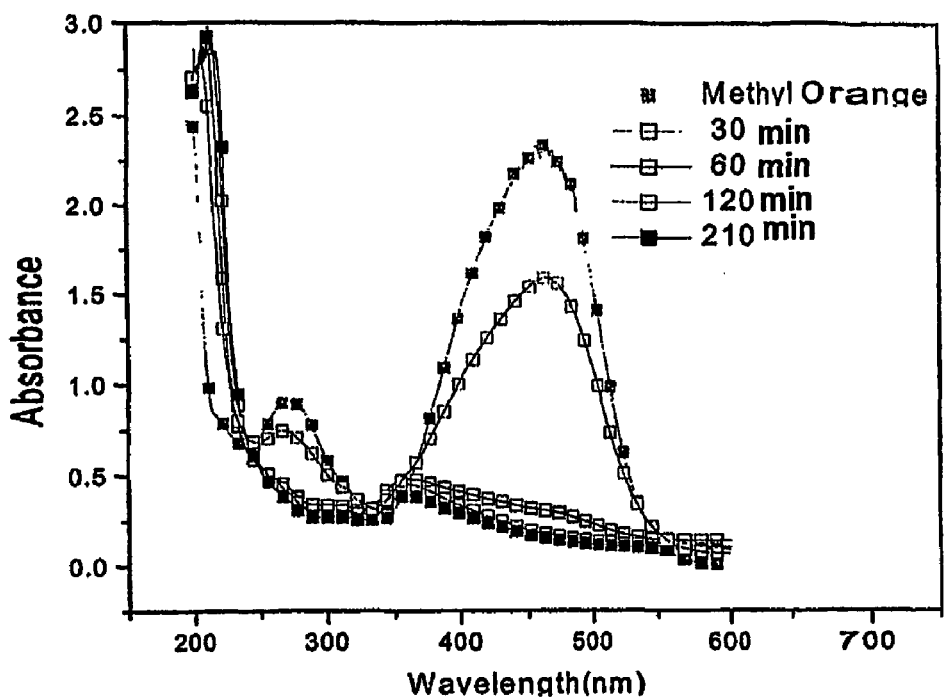

The dye adsorptivity of the polymer gel on varying the surfactant monomer was measured. 30 mg each of the polymer gels, PDTAA (C=10), PDTAM (c=10) and PDTAV (C=10), was added to 3 ml of 0.1 mM aqueous methyl orange and the absorbance thereof was measured. The results in FIG. 8 show that PDTAV has the best adsoptivity at the early stage but some time after that, the adsorptivity was in the order of PDTAV<PDTAM<PDTAA.

Experimental Example 3-2

The dye adsorptivity of the polymer gel on varying the length of the surfactant monomer was measured. 30 mg each of the polymer gels, PCTAA (C-16), PCTAM (c=16) and PCTAV (C=16) was added to 3 ml of 0.1 mM aqueous methyl orange and the absorbance thereof was measured. The results in FIG. 8 show that the polymer gels have similar adsorptivity at the early stage, but some time after that, the adsorptivity was in the order of PCTAV<PCTAA<PCTAM.

The results of Experimental Examples 3-1 and 3-2 show that as alkyl chain of the surfactant became longer, more dye was absorbed. Therefore, the adsorptivity may be controlled by adjusting the chain length of the surfactant, the pore size of the surfactant core changing with the alkyl chain length.

Experimental Example 4

Ionic Dye Adsorptivity and the Cross-linking Agent

Figure 14:
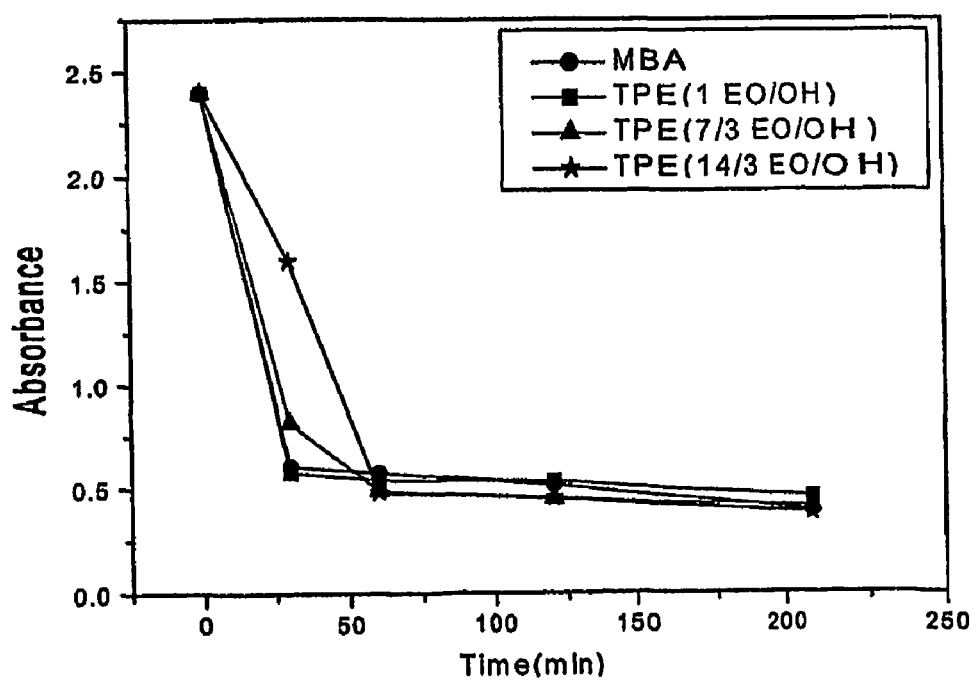
FIG. 14: UV-VIS spectra of the inventive organic polymer gels prepared in Examples 5 and 11 to 13 (aqueous methyl orange)

The dye adsorptivity of the polymer gel on varying the cross-linking agent was measured. Each of the polymer gels obtained in Examples 5 and 11 to 13 was added to aqueous methyl orange and the absorbance thereof was measured. The results are shown in FIGS. 10, 11, 12 and 13, respectively. The absorbances of the various cross-linking agents are shown in FIG. 14.

As can be seen from FIGS. 10 to 14, similar amounts of the dye were adsorbed regardless which cross-linked agents was used.

Experimental Example 5

Ionic Dye Adsorptivity and the Concentration of the Cross-linked Agent

The dye adsorptivity of the polymer gel on varying the concentration of the cross-linking agent used in preparation of the polymer gel was measured. Each of the cross-linked PCTAM in Example 5 and the polymer gels obtained in Examples 7 to 10 was added to methyl orange solution and the absorbance thereof was measured. The results are shown in FIG. 15.

Figure 15:
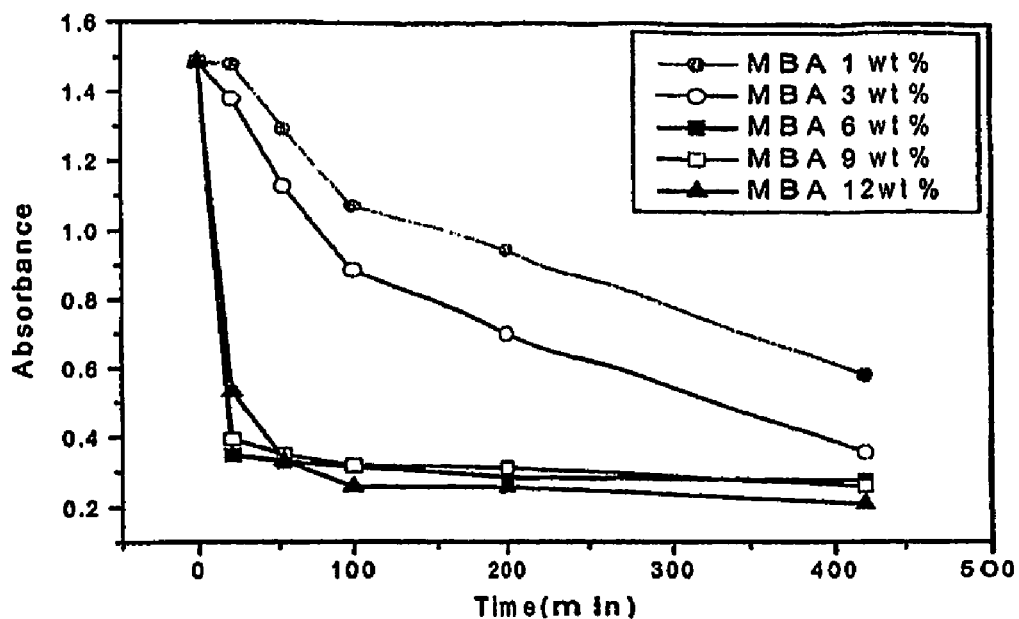
FIG. 15: UV-VIS spectra of the inventive organic polymer gels prepared in Examples 5 and 7 to 10 (aqueous methyl orange)

As can be seen from FIG. 15, the absorbance decreased slowly in case the concentration of the cross-linking agent MBA was 3 wt % or less, while the absorbance rapidly dropped, i.e., the dye adsorption rate rapidly increased in case that the concentration of the cross-lining agent MBA was 6 wt % or more. This results suggests that the rate of dye absorption increases as the amount of the cross-linking agent used increases.

Experimental Example 6

Adsorptivity Comparision in Methyl Red Solution 30 mg each of the polymer gels, PDTAM and PCTAM obtained in Examples 2 and 5, respectively, was added to 3 ml of aqueous methyl red and the absorbance thereof was measured. The results are shown in FIG. 16.

Figure 16:
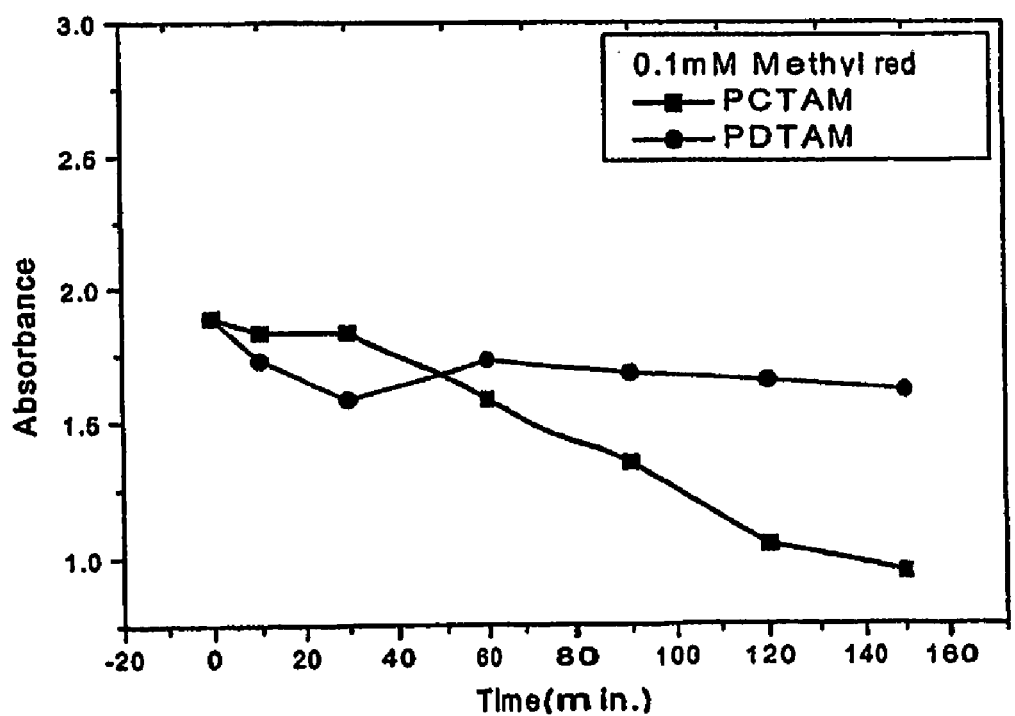
FIG. 16: UV-VIS spectra of the inventive organic polymer gel PDTAM prepared in Example 2 (aqueous methyl red, methyl green, phenol red and rhodamine B)
Figure 17:
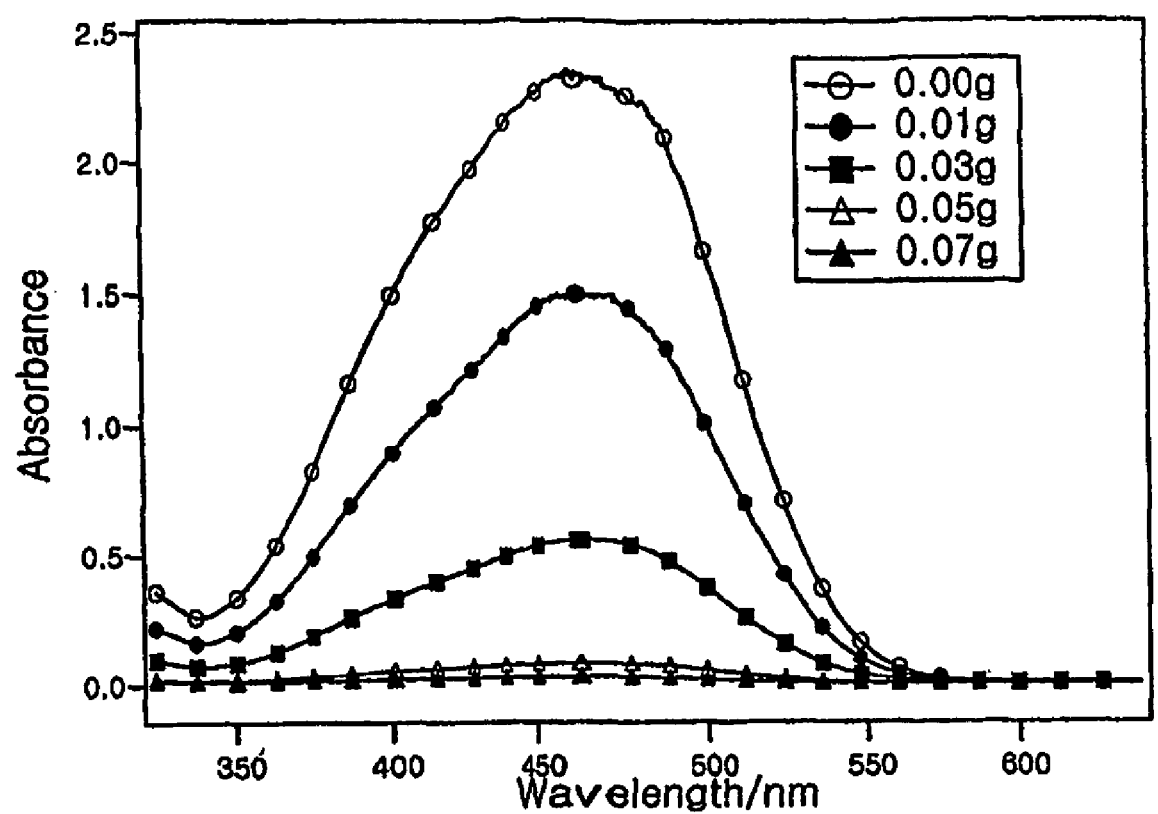
FIG. 17: UV-VIS spectra of the inventive inorganic polymer gel prepared in Example 14 (aqueous methyl orange).

As can be seen from FIG. 16, the polymer gel PCTAM having a longer carbon chain adsorbed more dye than PDTAM.

Experimental Example 7

Dye Adsorptivity of the Inorganic Polymer Gel

The dye adsorptivity of the inorganic polymer gel obtained in Example 14 was measured. 0.0 g, 0.01 g, 0.03 g and 0.05 g of the inorganic polymer gel was added to 20 ml of 0.1 mM methyl orange and after 15 minutes, the inorganic polymer gel was filtered off from the solution with a paper filter. Then, the absorbance of the filtered solution was measured with a UV-VIS spectrometer. The results in FIG.

17 shows that the absorbance increased as the amount of the inorganic polymer gel increased.

According to the present invention, a polymer gel having a surfactant-like micelle structure obtained by polymerization or condensation polymerization of an ionic surfactant and an organic or inorganic compound having polymerizable moiety is capable of adsorbing and separating specific compounds in an easy recyclable manner.

What is claimed is:

1. An organic polymer gel obtained by polymerizing a monomer comprising an ionic surfactant moiety and a polymerizable organic counter ion in the presence of a cross-linking agent at or above the surfactant's critical micelle concentration.

2. The organic polymer gel of claim 1 which has a micelle structure having inwardly oriented hydrophobic groups of the surfactant and an outer shell of polymerized organic counter ions bound to the hydrophilic groups of the surfactant.

3. The organic polymer gel of claim 1, wherein the ionic surfactant is a cationic surfactant selected from halogenated and ethylsulfated alkyltrimethylammonium.

4. The organic polymer gel of claim 3, wherein the alkyl is $C_{7-40}$, alkyl.

5. The organic polymer gel of claim 3, wherein the monomer is selected from the group consisting of alkyltrimethylammonium acrylate, alkyltrimethylammonium (meth)acrylate, alkyltrimethylammonium vinylacetate, alkyltrimethylammonium vinylbenzoate, alkyltrimethylammonium vinylphosphonate, alkyltrimethylammonium vinylsulfonate, alkyltrimethylammonium vinylbenzenesulfonate, alkyltriethylammonium acrylate, alkyltriethylammonium (meth)acrylate, alkyltriethylammonium vinylacetate, alkyltriethylammonium vinylbenzoate, alkyltriethylammonium vinylphosphonate, alkyltriethylammonium vinylsulfonate and alkyltriethylammonium vinylbenzenesulfonate.

6. The organic polymer gel of claim 5, wherein the monomer is selected from the group consisting of decyltrimethylammonium acrylate, decyltrimethylammonium (meth)acrylate, decyltrimethylammonium vinylacetate, decyltrimethylammonium vinylbenzoate, decyltrimethylammonium vinylphosphonate, decyltrimethylammonium vinylsulfonate, decyltrimethylammonium vinylbenzenesulfonate, decyltrimethylammonium acrylate, decyltrimethylammonium (meth)acrylate, decyltrimethylammonium vinylacetate, decyltrimethylammonium vinylbenzoate, decyltrimethylammonium vinylphosphonate, decyltrimethylammonium vinylsulfonate, decyltriethyammonium vinyl benzenesulfonate, cetyltrimethylammonium acrylate, cetyltrimethylammonium (meth)acrylate, cetyltrimethylammonium vinylacetate, cetyltrimethylammonium vinylbenzoate, cetyltrimethylammonium vinylphosphonate, cetyltrimethylammonium vinylsulfonate, cetyltrimethylammonium vinyl benzenesulfonate, cetyltrimethylammonium acrylate, cetyltrimethylammonium (meth)acrylate, cetyltrimethylammonium vinylacetate, cetyltrimethylammonium vinylbenzoate, cetyltrimethylammonium vinylphosphonate, cetyltrimethylammonium vinylsulfonate and cetyltrimethylammonium vinyl benzenesulfonate.

7. The organic polymer gel of claim 1, wherein the ionic surfactant is an anionic surfactant having an anionic group of —COO⁻, —SO₃⁻, —OSO₃⁻² or —PO₃⁻².

8. The organic polymer gel of claim 7, wherein the monomer is selected from the group consisting of vinylpynidinium alkylcarboxylate, vinylpyridinium alkylbenzoate, vinylpyridinium alkylsulfonate, vinylpyridinium benzenesulfonate, vinylpynidinium alkylphosphonate, alkyltrimethylammonium alkylcarboxylate, allyltniethylammonium alkylcarboxylate, alkyltrimethylammonium alkylsulfonate, allyltriethylammonium alkylsulfonate, allyltrimethylanmmonium alkylphosphonate and allyltriethylammonium alkylphosphonate.

9. The organic polymer gel of claim 8, wherein the alkyl is $C_{7-40}$ alkyl.

10. The organic polymer gel of claim 1, wherein the polymerizable group contained in the polymerizable organic counter ion is a vinyl or ethoxy group.

11. The organic polymer gel of claim 1, wherein the cross-linking agent is a compound having at least two double bonds.

12. The organic polymer gel of claim 11, wherein the cross-linking agent is selected from the group consisting of methylenebisacrylarmide (MBA), divinylbenzene, trimethylolpropane ethoxylate (1/3 EO/OH) methylether diacylate (TPE-1), trimethylolpropane ethoxylate (7/3E0/OH) methylether diacylate (TPE-7), trimethylolpropane ethoxylate (14/3 E0/OH) methylether diacylate (TPE-14), trimethylolpropane and a mixture thereof.

13. The organic polymer gel of claim 1, wherein the cross-linking agent is added in an amount of 0.01 to 5 mol based on a mol of the monomer.

14. The organic polymer gel of claim 1, wherein the polymerization is carried out at room temperature to 100° C. for 2 to 12 hours.

15. A method for separating an ionic or water-soluble material from a solution containing the ionic or water-soluble material using the organic polymer gel of any one of claims 1 to 14.

16. The method of claim 15, wherein the ionic material is a dye selected from the group consisting of methyl orange, methyl red, methyl green, rhodamine B and methyl violet.

17. The method of claim 15, wherein the water-soluble material is brornocresol purple or phenol red.

18. An inorganic polymer gel obtained by condensation polymerization of a surfactant and an inorganic compound having a reactive group which is condensible with the surfactant at or above the surfactant's critical micelle concentration.

19. The inorganic polymer gel of claim 18, wherein the surfactant is a cationic surfactant selected from halogenated and ethylsulfated alkyltrimethylammonium.

20. The inorganic polymer gel of claim 19, wherein the alkyl is $C_{7-40}$ alkyl.

21. The inorganic polymer gel of claim 18, wherein the surfactant is an anionic surfactant having an anionic group of —COO⁻, —SO₃, —OSO₃⁻² or —PO₃⁻².

22. The inorganic polymer gel of claim 18, wherein the inorganic compound is selected from the group consisting of tetramethylorthosilicate, tetraethylorthosilicate, titanium tetraethoxide, aluminum isopropoxide, trimethylborate, chlorodimethylalkylsilane and sodium silicate.

23. The inorganic polymer gel of claim 18, wherein the condensation polymerization is carried out at 0 to 120° C. for 0.1 to 100 hours.

24. The inorganic polymer gel of claim 18, wherein the surfactant is added in an amount of 0.05 to 0.5 mole based on a mole of the inorganic compound.

25. A method for separating an ionic or water-soluble material from a solution containing the ionic or water-soluble material using the inorganic polymer gel of any one of claims 18 to 24.

26. The method of claim 25, wherein the ionic material is selected a dye from the group consisting of methyl orange, methyl red, methyl green, rhodamine B and methyl violet.

27. The method of claim 25, wherein the water-soluble material is bromocresol purple or phenol red.

* * * * *